United States Patent [19]
Rogers

[11] 3,787,833
[45] Jan. 22, 1974

[54] UPSHIFT CONTROL FOR VIDEO DISPLAY

[75] Inventor: William P. Rogers, Collingswood, N.J.

[73] Assignee: GTE Information Systems Incorporated, Stamford, Conn.

[22] Filed: May 4, 1973

[21] Appl. No.: 357,248

Related U.S. Application Data

[63] Continuation-in-part of Ser. No. 58,030, July 24, 1970.

[52] U.S. Cl. ......... 340/324 AD, 340/154, 340/172.5
[51] Int. Cl. ............................................. G06f 3/14
[58] Field of Search ........... 340/172.5, 324 AD, 154

[56] References Cited

UNITED STATES PATENTS

| | | | |
|---|---|---|---|
| 3,422,420 | 1/1969 | Clark | 340/324 AD |
| 3,593,310 | 7/1971 | Kievit | 340/172.5 |
| 3,611,348 | 10/1971 | Rogers | 340/324 AD |
| 3,614,766 | 10/1971 | Kievit | 340/324 AD |
| 3,643,252 | 2/1972 | Roberts | 340/324 AD |
| 3,676,850 | 7/1972 | Goldman et al. | 340/154 |

*Primary Examiner*—David L. Trafton
*Attorney, Agent, or Firm*—David M. Keay; Elmer J. Nealon; Norman J. O'Malley

[57] ABSTRACT

A video display system in which information from a teletype line is displayed in rows on the face of a video display device with new information first appearing on the bottom row, continually being upshifted row by row to the top row, and then disappearing. Information is continually advanced in a recirculating delay line memory by an upshifting arrangement coupled between the output and the input of the memory. Information is taken from the memory as it advances therethrough and is held in display registers from which it is read out at successively earlier times during succeeding frames.

8 Claims, 5 Drawing Figures

| SCANLINE | |
|---|---|
| 0 | |
| 10 | |
| 20 | NON-UPSHIFTING DISPLAY |
| 30 | |
| 40 | |
| 50 | |
| 60–70 | ROW 1 |
| 80–90 | ROW 2 |
| 100–110 | ROW 3 |
| 120–130 | ROW 4 |
| 140–150 | ROW 5 |
| 160–170 | ROW 6 |
| 180–190 | ROW 7 |
| 200–210 | ROW 8 |
| 220–230 | ROW 9 |
| 240–250 | ROW 10 VERTICAL SYNC AND RETRACE NOT DISPLAYED |
| 260 | |

| MEMORY SEGMENT | INFORMATION STORED IN SEGMENTS |
|---|---|
| 1A | ROW 5 DATA |
| 1B | ROW 5 DATA |
| 2A | |
| 2B | |
| 3A | ROW 6 DATA |
| 3B | ROW 6 DATA |
| 4A | |
| 4B | |
| 5A | ROW 7 DATA |
| 5B | ROW 7 DATA |
| 6A | ROW 1 DATA |
| 6B | ROW 1 DATA |
| 7A | ROW 8 DATA |
| 7B | ROW 8 DATA |
| 8A | ROW 2 DATA |
| 8B | ROW 2 DATA |
| 9A | ROW 9 DATA |
| 9B | ROW 9 DATA |
| 10A | ROW 3 DATA |
| 10B | ROW 3 DATA |
| 11A | ROW 10 DATA |
| 11B | ROW 10 DATA |
| 12A | ROW 4 DATA |
| 12B | ROW 4 DATA |
| 13A | |
| 13B | |
| 1A | ROW 5 DATA |
| 1B | ROW 5 DATA |
| 2A | |
| 2B | |
| 3A | ROW 6 DATA |
| 3B | ROW 6 DATA |
| 4A | |
| 4B | |
| 5A | ROW 7 DATA |
| 5B | ROW 7 DATA |
| 6A | ROW 1 DATA |
| 6B | ROW 1 DATA |
| 7A | ROW 8 DATA |
| 7B | ROW 8 DATA |
| 8A | ROW 2 DATA |
| 8B | ROW 2 DATA |
| 9A | ROW 9 DATA |
| 9B | ROW 9 DATA |
| 10A | ROW 3 DATA |
| 10B | ROW 3 DATA |
| 11A | ROW 10 DATA |
| 11B | ROW 10 DATA |
| 12A | ROW 4 DATA |
| 12B | ROW 4 DATA |
| 13A | |
| 13B | |

Fig. 3.

| FRAME OF UPSHIFT CYCLE | FIRST MEMORY RECIRCULATION REPOSITION DATA FROM | TO | SECOND MEMORY RECIRCULATION REPOSITION DATA FROM | TO |
|---|---|---|---|---|
| 1 | 6A | 5B | 8A | 7B |
| 2 | 10A | 9B | 12A | 11B |
| 3 | 1A | 13B | 3A | 2B |
| 4 | 5A | 4B | 7A | 6B |
| 5 | 9A | 8B | 11A | 10B |
| 6 | 5B | 5A | 7B | 7A |
| 7 | 9B | 9A | 11B | 11A |
| 8 | 13B | 13A | 2B | 2A |
| 9 | 4B | 4A | 6B | 6A |
| 10 | 8B | 8A | 10B | 10A |
| 11 | 5A | 4B | 7A | 6B |
| 12 | 9A | 8B | 11A | 10B |
| 13 | 13A | 12B | 2A | 1B |
| 14 | 4A | 3B | 6A | 5B |
| 15 | 8A | 7B | 10A | 9B |
| 16 | 4B | 4A | 6B | 6A |
| 17 | 8B | 8A | 10B | 10A |
| 18 | 12B | 12A | 1B | 1A |
| 19 | 3B | 3A | 5B | 5A |
| 20 | 7B | 7A | 9B | 9A |

RELOCATION OF DATA IN MEMORY

Fig. 4.

| | | FRAMES 1-5 | FRAMES 6-10 | FRAMES 11-15 | FRAMES 16-20 |
|---|---|---|---|---|---|
| NOT DISPLAYED | | 13A | 12B | 12A | 11B |
| | | 2A | 1B | 1A | 13B |
| | | 4A | 3B | 3A | 2B |
| DISPLAY ROW | 1 | 6A | 5B | 5A | 4B |
| | 2 | 8A | 7B | 7A | 6B |
| | 3 | 10A | 9B | 9A | 8B |
| | 4 | 12A | 11B | 11A | 10B |
| | 5 | 1A | 13B | 13A | 12B |
| | 6 | 3A | 2B | 2A | 1B |
| | 7 | 5A | 4B | 4A | 3B |
| | 8 | 7A | 6B | 6A | 5B |
| | 9 | 9A | 8B | 8A | 7B |
| | 10 | 11A | 10B | 10A | 9B |

MEMORY SEGMENTS LOADED INTO DISPLAY REGISTERS

Fig. 5.

UPSHIFT CONTROL FOR VIDEO DISPLAY

CROSS-REFERENCE TO RELATED APPLICATION

This application is a continuation-in-part of copending application Ser. No. 58,030 filed July 24, 1970.

BACKGROUND OF THE INVENTION

This invention relates to video display systems in which displayed data is continually upshifted. More particularly, it is concerned with video display systems for upshifting information displayed in the form of vertically spaced horizontal rows on a television picture tube, wherein new information is entered on the bottom row and the information is upshifted row by row until the information originally displayed in the top row disappears.

Various types of video display systems which continually upshift displayed information are known in the art. One particularly useful system is disclosed and claimed in U.S. Pat. No. 3,643,252 entitled "Video Display Apparatus" which issued to Richardson S. Roberts, Jr. on Feb. 15, 1972. In the apparatus disclosed in the patent, information is caused to upshift on the display surface of the television picture tube by reducing the frame rate of the raster scanline pattern over the display surface slightly over each period of a number of frames, thereby causing the displayed information to precess upward during succeeding frames.

Although this type of apparatus has been found suitable for many applications, it is not possible to combine this technique with other types of display which require a fixed frame rate. In addition, at the end of each cycle of upshifting there is a jerk of the displayed information which is noticeable under certain viewing conditions.

SUMMARY OF THE INVENTION

A system in accordance with the present invention for displaying information which is continually upshifted employs a fixed frame rate thereby overcoming the aforementioned problems. The system produces images of characters on the display surface of a video display means by selectively writing on the display surface while repeatedly sweeping fields of a raster scanline pattern over the display surface. The characters are arranged in rows with new information first appearing in a row at one edge of the display, for example, the bottom, and moving towards the opposite edge, the top, before disappearing. Information moves from one row to the previous location of the adjacent earlier displayed row during the period of a single upshift cycle.

The system includes a memory means which has a plurality of storage segments arranged in sequence. Each segment is capable of storing data for a single row of characters. The data in a segment is erased automatically when new data is entered. A recirculating means causes each segment to be connected in recurring sequence to a memory input connection and to a memory output connection of the memory means at a memory recirculation rate. New information data is supplied to the memory means at the input connection.

The system also includes a memory upshift register means which is capable of storing data for a single row and is coupled between the output connection and the input connection of the memory means. A memory upshift control means is coupled to the memory upshift register means for causing data to be read out from a different one of the storage segments during each memory recirculation cycle of an upshift cycle and stored in the memory upshift register means. The memory upshift control means also removes the stored data from the memory upshift register means within the period of a memory recirculation cycle and stores the data in a different storage segment which is connected to the memory input connection earlier in a memory recirculation cycle than the storage segment from which the data was read out. During the period of an upshift cycle the data for each row is relocated in the storage segments previously containing data for the adjacent earlier displayed row. That is, data is continually being shifted to earlier positions in the memory means.

A display register means capable of storing data for a single row is coupled to the output connection of the memory means. Data is read out of the storage segments of the memory means during each field of the raster scanline pattern by a memory output control means which causes the data for each row in turn to be stored in the display register means. A display register output control means causes the data for each row to be read out of the display register means at successively earlier times during each succeeding field of an upshift cycle. A video signal generating means coupled to the display register means generates video signals for producing images of a row of characters on the display surface in response to the data from a row being read out of the display register means.

BRIEF DESCRIPTION OF THE DRAWINGS

Additional objects, features, and advantages of upshifting display systems in accordance with the present invention will be apparent from the following detailed discussion together with the accompanying drawings wherein:

FIG. 3 is a chart illustrating relationships between the horizontal scanlines of the display device, the rows of displayed data, the circulation of the recirculating memory, and the location of data stored within the memory at the start of an upshift cycle;

FIG. 4 is a chart illustrating the relocation of data within the segments of the memory during an upshift cycle; and FIG. 5 is a chart illustrating the sequence in which data is read out of the memory and loaded into the display registers for display on the display device during an upshift cycle.

DESCRIPTION OF THE PREFERRED EMBODIMENT

General

Figure 1:
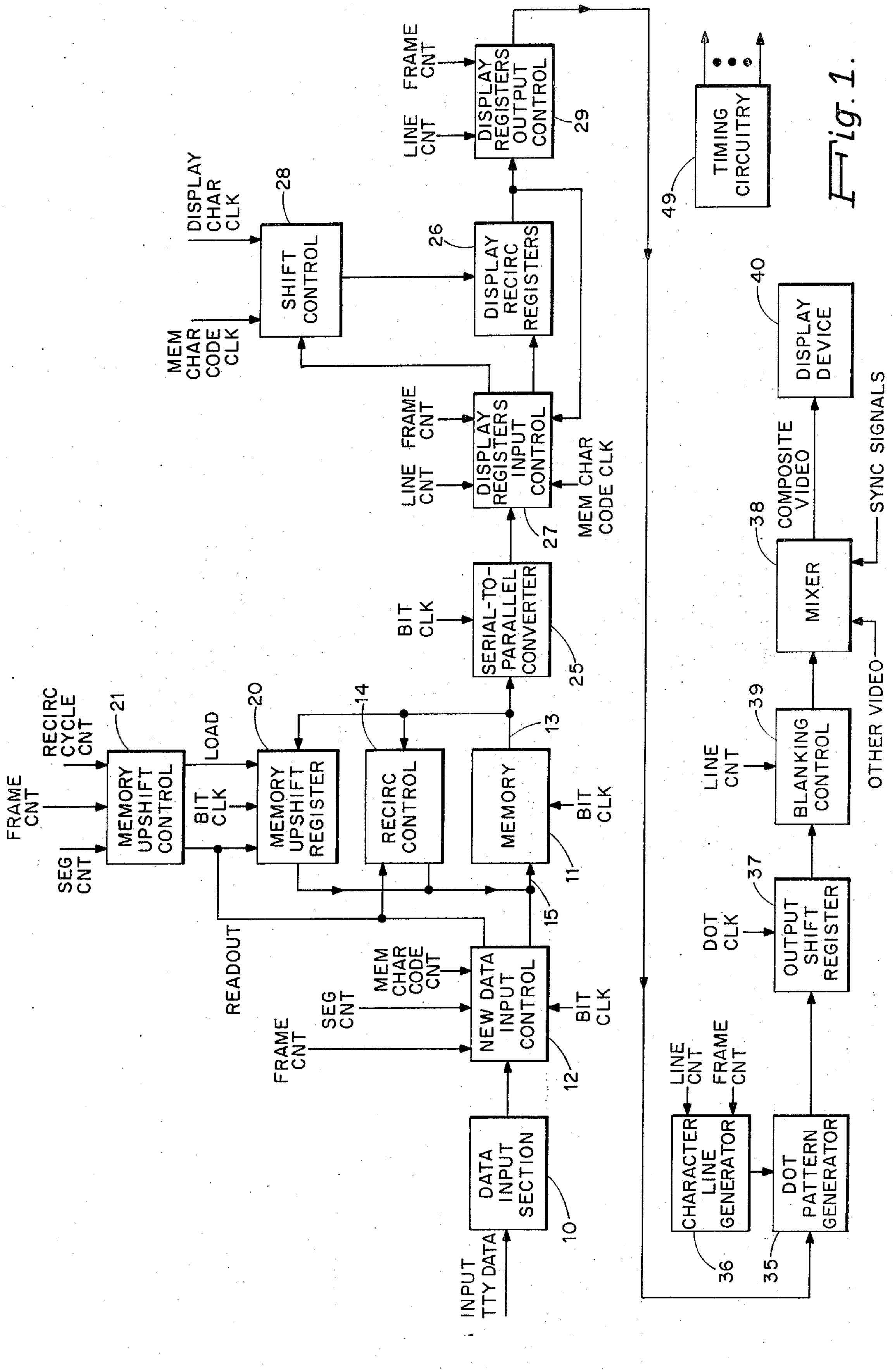
FIG. 1 is a schematic block diagram of an upshifting display system in accordance with the present invention.

FIG. 1 is a block diagram illustrating a display system in accordance with the present invention. Input data from a teletype or similar device is applied to the system in series-bit, series-character format designating characters in a conventional code, for example a 5-bit TTY code. The data is entered into the system at a data input section 10 where it is decommutated and appropriately framed for entering into a memory 11. A sixth bit is added by the data input section to provide numeral or letter identification of the character. The memory 11 in the illustrated embodiment is a recirculating delay line memory. Data from the data input section 10 is entered into the memory 11 at the appropriate time under control of a new data input control 12. The entire data content of the memory 11 is continuously circulated through the memory. Data appearing at the output terminal 13 passes through a recirculating control 14 and re-enters the memory 11 at the input terminal 15. The data in the memory is continually upshifted to an earlier position in the memory by a memory upshift register 20 connected between the output and input of the memory 11 and operating under control of a memory upshift control 21.

Data from the memory 11 is converted to parallel-bit, series-character format by a serial-to-parallel converter 25. Data for display is loaded into display recirculating registers 26 from the serial-to-parallel converter 25 by a display registers input control 27. The data is circulated in the display recirculating registers 26 at an appropriate rate as determined by a shift control 28. The data is read out of the display recirculating registers 26 at the appropriate times for display in the position on the display surface under control of a display registers output control 29.

The character codes from the display recirculating registers 26 are applied to a dot pattern generator 35 of known type which generates an appropriate dot pattern for each scanline as determined by the character code and the particular scanline of the character as determined by the character line generator 36. The dot pattern for the portion of each character in a scanline is applied in parallel to an output shift register 37. The output shift register 37 converts the parallel dot character pattern to serial format and applies the dot signals to a mixer 38 by way of a blanking control 39. The mixer 38 combines the output of the output shift register 37 with conventional synchronizing signals and also with other video signals to produce a composite video signal which is applied to a conventional video display device 40.

For the purposes of simplifying the explanation herein the following specific parameters of a particular embodiment of the invention are employed throughout the discussion. The display device 40 is a television picture tube device in which a raster scanline pattern is repeatedly swept over the display surface. The individual scanlines are traced horizontally from left to right and the pattern of the raster is swept vertically downward. There is no interlace of scanlines and therefore the field rate and frame rate are the same. The frame rate is 60 Hz. The total number of scanlines for each frame is 260 scanlines, a rate of 15,600 Hz. FIG. 3 illustrates the arrangement of the scanlines on the display surface. Of the 260 scanlines the first 60 are employed for displaying information which does not upshift in accordance with the present invention. Although this arrangement is not an essential feature of the invention, it is discussed in this particular example to indicate the manner in which the upshifting display features of the invention are compatible with other forms of display on the same television picture tube. Scanlines 61 through 240, 180 lines, are employed for displaying the upshifting data and scanlines 240 to 260 are employed for vertical synchronization and retrace times and are blanked out and not displayed.

The upshifting portion of the display includes nine rows of information which are displayed at a time. A 10th row is also part of the data content but is not displayed until some upshifting occurs. Each row of information is displayed in 10 horizontal scanlines, and adjacent rows are separated by spaces of 10 scanlines. In the present example each alphanumeric character requires a $5 \times 10$ dot matrix with two additional dots between adjacent characters. Thus, a space of seven dots is employed for each character.

In the present example up to 50 characters may be displayed in each row. The input data is applied to the system in the form of a standard 5-bit character code, and a numeral or letter identification bit is added to produce 6-bit character codes. Thus, each row of 50 characters requires 300 bits. The recirculating delay line memory 11 contains a total of 26 segments, each segment capable of storing 300 bits or one row of data.

A complete cycle during which the rows of data are upshifted to the locations on the display surface previously occupied by the preceding rows is termed an upshift cycle. During each succeeding frame the displayed information is advanced by one scanline. The complete movement of a row of data from one row location to the next thus requires 20 frames, one complete upshift cycle.

Detailed Description

Figure 2:
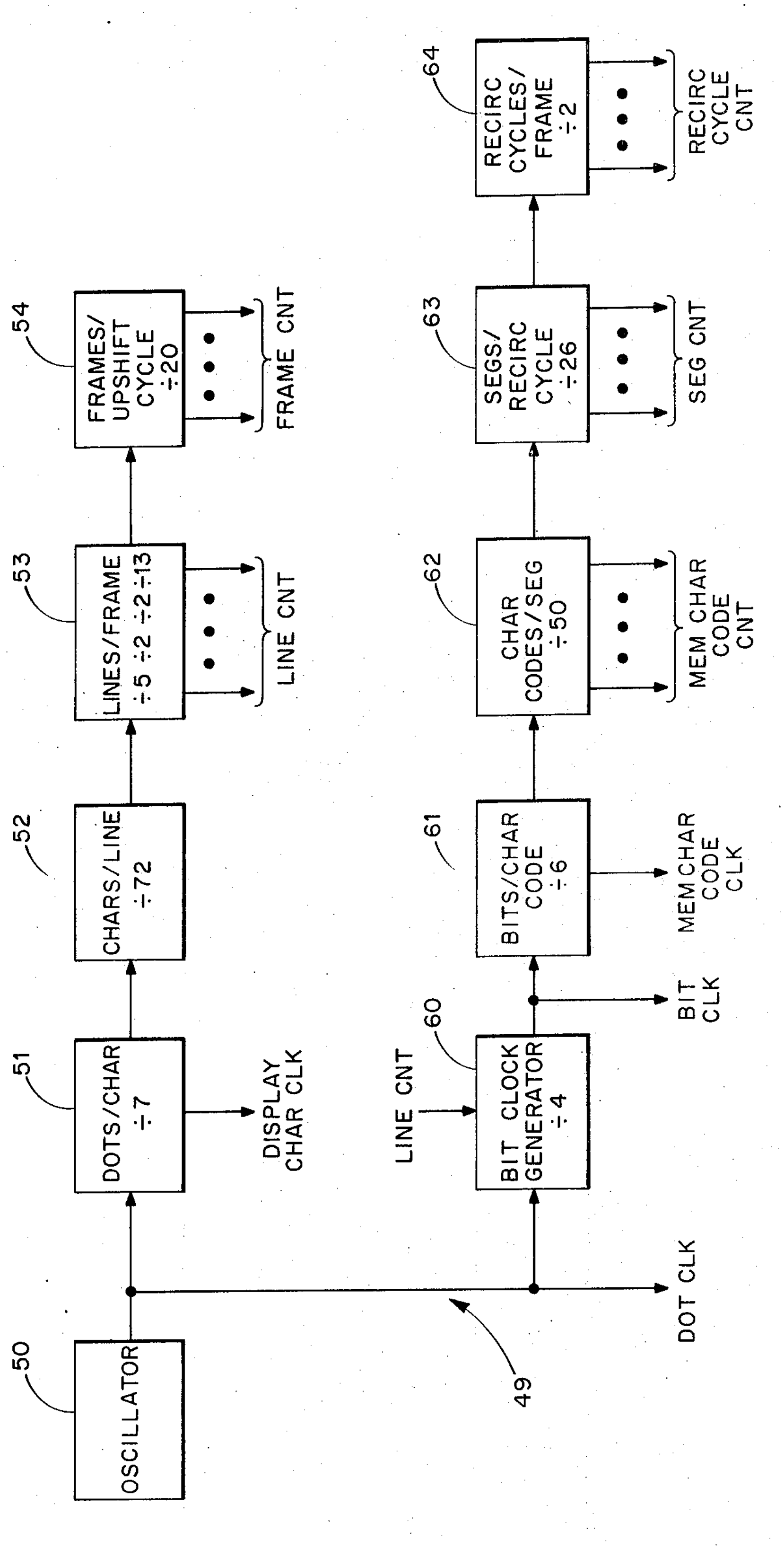
FIG. 2 is a schematic block diagram of a portion of the apparatus for producing the basic timing and synchronizing signals employed in controlling the operation of the system.

FIG. 2 is a schematic block diagram of the circuitry 49 which generates the basic timing and control signals for synchronizing the operation of the various portions of the apparatus. The apparatus operates from a master oscillator 50 which produces clock pulses at the rate of 7.8624 MHz. This frequency is the rate of the dots which form the images to the alphanumeric characters on the display surface of the display device.

The dot clock pulses from the oscillator 50 are applied to a train of divider and decoder sections to produce a plurality of counting and clock signals for controlling the system. The output of the oscillator 50 is applied to a dots/character section 51 which divides by 7, the number of dots along a scanline for each alphanumeric character space. A display character clock pulse signal is obtained from the dots/character section 51. The output of the divider of the dots/character section 51 is applied to a divide-by-72 characters/line section 52. Although, as explained previously, 50 characters are displayed in each row, the additional number of character spaces are to provide time for the horizontal synchronization signals and retrace.

The output of the divider of the characters/line section 52 is applied to lines/frame section 53. The lines/frame section is a series of divide-by-5, divide-by-2, divide-by-2, and divide-by-13 dividers. The outputs of the divider stages are decoded to provide repetitive counts of each of 10 scanlines as well as each of 13 groups of 20 scanlines, and also to provide a count over the entire number of 260 scanlines in each frame. The output of the last divider of the lines/frame section 53 is applied to a frames/upshift cycle section 54 including a divide-by-20 divider. As explained previously 20 frames are required for an upshift cycle. The outputs from the divider stages are decoded to provide a count of the frames of each upshift cycle. The frames/upshift cycle section 54 also includes a control flip-flop which is triggered by the receipt of a line-feed character in the TTY input data to initiate a count through an upshift cycle in synchronism with the start of a frame.

The dot clock pulses from the oscillator 50 are also applied to a bit clock generator 60 which divides by 4. The bit clock generator is employed as the basic clock for controlling the processing of data through loading into the display recirculating registers 26. In order to synchronize operation of the portions of the system operating at the bit clock rate with those operating at the dot clock rate, the bit clock generator 60 operates for a period of 300 bit clock pulses for every five scanlines. That is, it produces 300 bit clock pulses at a 1.9656 MHz rate then ceases operation until it receives line count information that five scanlines have occurred since the start of the 300 bit clock pulses. The generator then restarts, counting for a period of 300 bit clock pulses during the next five scanlines. Thus, 300 bits or one segment of data circulates past the input and output terminals of the recirculating memory 11 during each period of five scanlines.

The bit clock pulses from the bit clock generator 60 are also applied to a bits/character code section 61 which divides by 6, since there are 6 bits in each character code. A memory character code clock pulse signal is obtained from the bits/character code section 61. The output of the divider of the bits/character code section 61 is applied to a character/segment section 62. This section divides by 50, the number of character codes in each segment which is also the number of characters in a displayed row. The outputs of the divider stages are decoded to provide counts of the character codes. The output of this section is applied to a segments/recirculation cycle section 63 which includes a divide-by-26 divider. The decoded outputs of the divider stages provide a count of the segments of the memory 11 passing by the input and output connections. The output of this section is divided by 2 in a recirculating cycles/frame section 64 to provide a count of the recirculating cycles of the memory for each frame.

The detailed design of the timing circuitry 49 of FIG. 2 to provide the required signals is a straightforward arrangement of dividers, gates, and other logic elements employing principles well-known to those skilled in the art. In addition, the design of the various control portions of the system of FIG. 1 which utilize the basic signals from the timing circuitry 49 to operate the system requires only the application of known straightforward design procedures.

In the system as illustrated in FIG. 1 the teletype input data is received in series-bit, series-character format with each alphanumeric character designated by a standard 5-bit TTY code. In the data input section 10 the data is appropriately processed in well-known manner to convert to a 6-bit code, frame the data, and hold it in preparation for entry into the memory 11 a character at a time. The data leaves the data input section 10 in series-bit format. The new data input control 12 enters new data into the memory 11 at the proper time during an upshift cycle so as to place the data for a new character in the proper segments of the memory. In order to be enabled to perform this function at the proper time, the new data input control 12 receives frame count, segment count, and memory character code count information from the timing circuitry 49.

The memory 11 is a delay line memory of 26 segments each of which is capable of storing 300 bits of data (one row) in series. The segments are designated 1A, 1B, 2A, 2B . . . 13A, and 13B in order. The memory recirculates data at the bit clock rate. For purposes of ease of explanation it is considered that the segments containing the data circulate. Data leaves the memory 11 at the output 13 and recirculates through the recirculating control 14 to the input 15. The recirculating control 14 is normally on, permitting the recirculation of data from the output to the input except when new data is being entered from the new data input control 12 or when data being upshifted is re-entered in the memory 11 from the memory upshift register 20 as will be explained hereinbelow. At the start of each upshift cycle 10 rows of data are present in the memory. Data is duplicated in the memory with data for a row being present in two adjacent segments of the memory. The memory 11 recirculates its data content at twice the frame rate of the video display device 40, that is, at 120 Hz.

The memory upshift register 20 transfers each row of data in serial fashion from segments of the memory to the next preceding segments to upshift data. The result is that the data in the memory at the beginning of an upshift cycle is advanced to the positions occupied by the preceding row data by the completion of the upshift cycle. During each recirculation of data through the memory 11 a segment of data is loaded into the memory upshift register 20 and then re-entered at one segment earlier. There are two recirculations of data and thus two repositionings during each frame. Over a relocation cycle of 5 frames, data for all the rows is advanced to the next preceding segments.

The loading of data from the memory 11 into the memory upshift register 20 and readout of the data from the memory upshift register 20 back to the memory 11 is controlled by the memory upshift control 21. The memory upshift control 21 receives information on the segment count, frame count, and on the recirculation cycle count from the timing circuitry 49. This information is sufficient to enable the memory upshift control 21 to generate load and readout signals to the memory upshift register 20 at the proper times. The chart of FIG. 4 shows the sequence of relocating data in the memory 11 during an upshift cycle.

The recirculating control 14 between the output terminal 13 and the input terminal 15 is inactivated by the readout signal from the memory upshift control 21. Thus, the data in a segment at the output terminal during the readout signal is not recirculated but is replaced by the data from the memory upshift register 20.

Each segment of data as it appears at the output terminal 13 of the memory 11 is loaded into the serial-to-parallel converter 25 at the bit clock rate. The converter 25 holds 6 bits; that is, one complete 6-bit character code. Although every character code for every segment becomes loaded into the serial-to-parallel converter 25, only certain of the segments as determined by the display registers input control 27 are loaded into the display recirculating registers 26.

There are six display recirculating registers 26 for handling the 6-bit character codes in parallel-bit, series-character format as received from the serial-to-parallel converter 25. The registers contain the data for a single row from a single segment. The registers shift data at either the memory character code clock rate or the display character clock rate depending upon whether data is being loaded from the serial-to-parallel converter 25 or is already loaded and is being recirculated. The shift control 28 determines which clock pulses are applied to the registers.

The display registers input control 27 which controls the output from the memory 11 recieves information from the timing circuitry 49 on the line count and frame count and determines from this information when to load data from the serial-to-parallel converter 25 into the display recirculating registers 26. FIG. 5 shows the segments of data which are read out of the memory 11 and loaded into the display recirculating registers 26 over an upshift cycle, and FIG. 3 shows the relationships between the scanlines of a frame and the circulation of the segments past the output terminal 13 of the memory 11. While data is being loaded into the display recirculating registers 26, the display registers input control 27 causes the shift control 28 to shift data in the registers at the memory character code rate at which it is being received from the serial-to-parallel converter 25.

After the data for a row has been placed in the display recirculating registers 26, it is circulated passing from its output back to its input without interference from the display registers input control 27. The display registers input control 27 causes the shift control 28 to shift the data at the display character clock rate. Thus, the time for a complete recirculation of a row of data in the registers is equal to the time of tracing a scanline on the display surface of the video display device 40.

The row data circulating in the display recirculating registers 26 recirculates for a number of times which is different for each frame of a relocation cycle of five frames before it is read out by the display registers output control 29 and applied to the dot pattern generator 35. For each upshift cycle the data is held in the registers for five scanlines for frames 1, 6, 11, and 16; for four scanlines for frames 2, 7, 12, and 17; for three scanlines for frames 3, 8, 13, and 18; for two scanlines for frames 4, 9, 14, and 19; and for one scanline for frames 5, 10, 15, and 20.

The data for the 50 characters of a row is read out in parallel-bit, series-character format to the dot pattern generator 35. Each character code is associated with information on the particular one of the 10 lines of the character which is being traced in order to produce the particular dot pattern for that line of the designated character. The character line information is received from the character line generator 36. The character line is determined from the line count and frame count information received from the timing circuitry 49. Since the characters are constructed in 5 × 10 dot matrices, the output of the dot pattern generator 35 is five dots in parallel.

The five dot signals for characters are presented in parallel at the character clock rate to the output shift register 37. The shift register 37 operates at the dot clock rate to convert the dot information for each character line of each character to a series-dot, series-character format. Two additional dot spaces are introduced to provide a total of seven dots for each character space. The dot signals pass to a mixer 38 through a blanking control 39. The blanking control 39 operates from the line count information to assure that upshifting data is not displayed on the display device during horizontal scanlines 0 to 60 and 240 to 260 in accordance with the illustration in FIG. 3. The mixer 38 combines the upshifting video information with the necessary horizontal and vertical synchronizing signals and also with any other video information which is to be displayed in the first 60 lines of the display. The resulting composite video signal is transmitted by any of various means to video display devices 40.

Operation

As stated previously the chart of FIG. 3 illustrates the arrangement of the rows of displayed upshifting data on the display surface in relation to the 260 scanlines of the raster scanline pattern. In addition, the chart illustrates the timing of the 26 delay line segments of the memory 11 in relation to the scanlines. The chart also indicates the contents of the memory segments at the start of an upshift cycle.

The sequence in which the data for each row is relocated in the memory 11 to continually advance the data to earlier positions in the memory is illustrated by the chart of FIG. 4. As explained previously this upshifting takes place through the memory upshift register 20 under control of the memory upshift control 21. As illustrated in the chart of FIG. 4, during the first recirculation cycle of the memory during the first frame of an upshift cycle the data in segment 6A (row 1 data) is loaded into the memory upshift register 20 as the segment passes the output terminal 13. At the same time this data is also placed in the serial-to-parallel converter 25 and is recirculated through the recirculation control 14 to the input terminal 15 so as to be replaced in segment 6A. That is, the data is not erased from segment 6A even though it is loaded into the memory upshift register 20 and into the serial-to-parallel converter 25. The memory upshift control 21 causes the memory upshift register 20 to hold this data and load it into segment 5B as it passes the input terminal 15 immediately prior to the next passage of segment 6A. Thus the data on row 1 is advanced from segment 6A to segment 5B replacing one segment of row 7 data.

During the second memory recirculation of the first frame, the row 2 data in segment 8A is upshifted into segment 7B replacing row 8 data. This procedure continues and at the end of 5 frames the data for each of the 10 rows has been advanced by one segment. At the end of an upshift cycle of 20 frames all the data has been completely shifted from its previous segments to those of the next preceding rows.

As explained previously the 6-bit code for every character in the memory 11 is placed in sequence in the serial-to-parallel converter 25. However, only certain segments are utilized during each frame. FIG. 5 is a chart indicating the sequence in which segments of data are loaded into the display recirculating registers 26 during each of the frames of an upshift cycle. Each row of data requires 10 scanlines to be displayed and adjacent rows are separated by 10 blank scanlines. Also, the first 60 scanlines of the display are not utilized for upshifting information but are reserved for other use not pertinent to the present invention.

As shown in FIG. 5, during frames 1 through 5 the segments indicated in the first column are read out of the memory 11 and the data is loaded in succession into the display recirculating registers 26. During frames 6 through 10 the memory is read out one segment earlier to obtain the appropriate row data. This advancing of reading out data one segment earlier continues for each succeeding relocation cycle of five frames throughout the complete upshift cycle of 20 frames.

The display registers input control 27 which receives information on the line count and frame count determines when to read out data from the memory 11 and load it into the display recirculating registers 26. For example, as can be seen from FIG. 3, during the first frame of an upshift cycle when the row 2 data is in the display recirculating registers 26 it is utilized for the tenth time to display the 10th or bottommost line of the row 2 data during horizontal scanline 90. On the next scanline 91 the row 3 data located in segment 10A appears at the output terminal 13 of the memory 11. As can be seen from FIG. 3 a period involving the five scanlines 91 through 95 is utilized to pass the circulating data from the output terminal 13 through the serial-to-parallel converter 25. The display registers input control 27 which receives information that line count 91 is occurring and that it is the first frame of an upshift cycle permits the row 3 data in segment 10A to be loaded into the display recirculating registers 26 blocking recirculation of the row 2 data present therein. The 6-bit character codes are clocked into the registers at the memory character code clock rate. The display registers output control 29 prevents data from being read out of the registers during scanlines 91 through 95.

On the beginning of scanline 96 the display registers input control 27 causes the shift control 28 to circulate the data in the display recirculating registers 26 at the display character rate; that is, the rate at which characters are to be displayed on the display device 40. Since during the first frame on an upshift cycle the row 3 data is not to start appearing on the display surface until scanline 101, the display recirculating registers 26 continue to recirculate the data at the rate of one complete recirculation per scanline but the display registers output control 29 does not permit the data to be read out to the dot pattern generator 35. After holding the row 3 data in the display recirculating registers for five scanlines (96–100) the display registers output control 29 permits the data to be read out during scanline 101.

During the next 10 scanlines (101–110) the display registers output control 29 reads out the recirculating row 3 character codes 10 times. The dot pattern generator 35 receives the 6-bit character codes and a count of each of the 10 lines of the character from the character line generator 36. The dot pattern generator 35 converts this data to the appropriate dot pattern for each scanline which is applied to the display device 40 to produce the images of the characters for the row 3 information between scanlines 101 and 110.

As shown in FIG. 5, during the second frame of the upshift cycle the row 3 data in segment 10A is read out of the memory 11 by way of the serial-to-parallel converter 25 at the same time during the frame; that is, between rows 91 and 95. However, in order to obtain upshifting by one scanline the display registers output control 29 permits the display recirculating registers 26 to hold the data for only four scanlines before reading out during 10 successive scanlines. That is, data is read out for the first time on scanline 100 rather than scanline 101, and the data is read out for the 10th time on scanline 109 rather than 110. Thus, the row 3 data appears one scanline earlier during the second frame, or is upshifted by one scanline.

This procedure is repeated for each of the five frames of the first relocation cycle with the display registers output control 29 causing the data to be read out one scanline earlier for each succeeding frame. By the start of the sixth frame the row 3 data has been advanced to segment 9B of the memory. As indicated in FIG. 5 segment 9B is utilized for the display of row 3 data during frames 6–10. Segment 9B is read out between scanlines 86 and 90 as shown in FIG. 3. Thus, during frames 6 through 10 the display registers input control 27 causes readout from the memory to take place five scanlines earlier than during frames 1 through 5 in order to address the appropriate segments of the memory. Since on the fifth frame the row 3 data was first read out from the display recirculating registers 26 during scanline 97 it must be read out on scanline 96 for the first time during frame 6. That is, the data must remain in the registers for five scanlines before being read out. The display registers output control 29 receives information on line count and frame count and causes the data for each row to be read out five scanlines earlier during the sixth frame than during the first frame.

The system continues to operate in the manner indicated upshifting the display of row 3 data read out of segment 9B by one scanline for each of frames 7 through 10. As shown in FIG. 5 on frames 11 through 15 segment 9A, to which row 3 data has been upshifted, is read out between scanlines 81 and 85. Similarly, during frames 16 to 20 row 3 data is read out of segment 8B between scanlines 76 and 80. During each frame the row 3 data is read out of the registers 26 by the display registers output control 29 one scanline earlier than during the preceding frame until on frame 20 the row 3 data appears on the display surface from scanlines 82 to 91. On the first frame of the next upshift cycle the former row 3 data is now row 2 data and is located in segment 8A and will be read out and appear from scanlines 81 to 90 as shown for row 2 data in FIG. 3. Thus, it can be seen that over the period of an upshift cycle the data in the apparatus is upshifted by a row with the former row 1 data disappearing from the display and the former row 10 data moving into the row 9 position.

During an appropriate time in the upshift cycle, specifically, during the last frame, any data for a new row which is residing in the data input section 10 is placed in segments 11A and 11B of the memory 11. The new data input control 12 receives frame and segment count information and during frame 20 when segments 11A and 11B are passing the input terminal 15 the new data is loaded into these segments and the previous data blocked by the recirculating control 14. This new data becomes the row 10 data for the next upshift cycle.

While there has been shown and described what is considered a preferred embodiment of the present invention, it will be obvious to those skilled in the art that various changes and modifications may be made therein without departing from the invention as defined by the appended claims.

What is claimed is:

1. A system for displaying characters on a video display means of the type producing images of characters on a display surface by selectively writing on the display surface while repeatedly sweeping fields of a raster scanline pattern over the display surface, the characters being arranged in rows with new information first appearing in a row at one edge of the display and moving toward the opposite edge before disappearing, information being moved from one row to the previous location of the adjacent earlier displayed row during the period of an upshift cycle, said system including in combination memory means having a plurality of storage segments arranged in sequence, each segment being capable of storing data for a single row of characters, the data in any segment being erased automatically when new data is entered therein;

recirculating means for causing each segment to be connected in recurring sequence to a memory input connection and to a memory output connection of said memory means at a memory recirculation rate;

means for supplying new information data to the memory means at said input connection;

memory upshift register means coupled between the output connection and the input connection of said memory means and being capable of storing data for a single row;

memory upshift control means coupled to said memory upshift register means for reading out data from a different one of said storage segments during each memory recirculation cycle of an upshift cycle and storing the data in the memory upshift register means, and for removing the stored data from the memory upshift register means within the period of a memory recirculation cycle and storing the data in a different storage segment which is connected to the memory input connection earlier in a memory recirculation cycle than the storage segment from which the data was read out, the data for each row being relocated in the storage segments previously containing data for the adjacent earlier displayed row during the period of an upshift cycle;

display register means coupled to the output connection of said memory means and being capable of storing data for a single row;

memory output control means for reading out data for each row in turn from said storage segments of the memory means during each field of the raster scanline pattern and causing the data for each row in turn to be stored in said display register means;

display register output control means for reading out the data for each row from said display register means at successively earlier times during each succeeding field of an upshift cycle; and video signal generating means coupled to the display register means for generating video signals for producing images of a row of characters on the display surface in response to the data for a row being read out of the display register means.

2. A system for displaying characters on a video display means of the type producing images on a display surface by selectively writing on the display surface while repeatedly sweeping fields of a raster scanline pattern over the display surface, the characters being arranged in rows disposed parallel to the direction of tracing individual scanlines and with new information first appearing in a row at one edge of the display and moving in a direction perpendicular to the direction of tracing individual scanlines toward the opposite edge before disappearing, information being moved from one row to the previous location of the adjacent earlier displayed row during the period of an upshift cycle, said system including in combination memory means having a plurality of storage segments arranged in sequence, each segment being capable of storing data for a single row of characters, the number of segments being at least twice the number of rows of characters, the data for each row being stored in each of two storage segments, the data in any segment being erased automatically when new data is entered therein;

recirculating means for causing each segment to be connected in recurring sequence to a memory input connection and to a memory output connection of said memory means at a memory recirculation rate which is an integral multiple of the field rate;

memory upshift register means coupled between the output connection and the input connection of said memory means and being capable of storing data for a single row;

memory upshift control means coupled to said memory upshift register means for reading out data from a different one of said storage segments during each memory recirculation cycle of an upshift cycle and storing the data in the memory upshift register means, and for removing the stored data from the memory upshift register means within the period of a memory recirculation cycle and storing the data in a different storage segment which is connected to the memory input connection earlier in a memory recirculation cycle than the storage segment from which the data was read out, the data for all the rows becoming stored in storage segments earlier in the recurring sequence during a relocation cycle having a period equal to an integral number of fields, the data for each row being relocated in the storage segments previously containing data for the adjacent earlier displayed row during the period of an upshift cycle, an upshift cycle having a period equal to an integral number of relocation cycles;

incoming information means for supplying data for a new row of characters to the memory means at said input connection of the memory means to store the data in each of the two storage segments originally containing the most recent data at a time during each upshift cycle subsequent to relocating of the most recent data to earlier segments of the recurring sequence;

display register means coupled to the output connection of said memory means and being capable of storing data for a single row;

memory output control means for reading out data for each row in turn from said storage segments of the memory means during each field of the raster scanline pattern by reading out appropriate segments containing data for each row in turn earlier in the recurring sequence for each succeeding relocation cycle of an upshift cycle and causing the data for each row in turn to be stored in said display register means at an earlier time during the field for each succeeding relocation cycle of an upshift cycle;

display register output control means for repeatedly reading out the data for each row from said display register means at the scanline rate for the number of scanlines of a row of characters, the data for each row being read out at successively earlier scanlines during each succeeding field of a relocation cycle; and video signal generating means coupled to the display register means for generating video signals for producing images of a row of characters on the display surface in response to the data for a row being read out of the display register means.

3. A system for displaying characters in accordance with claim 2 wherein the images of each row of characters are written during tracing of an integral number of scanlines, and adjacent rows of characters are separated by blank spaces of the same number of scanlines; and said memory output control means reads out data from a storage segment of the memory means and stores the data in said display register means during the period equal to the number of scanlines of a blank space after the data for the previous row has completed being repeatedly read out from the display register means and applied to the video signal generating means.

4. A system for displaying characters in accordance with claim 3 wherein the memory recirculation rate is equal to twice the field rate; and said memory upshift control means stores the data removed from said memory upshift register means in the storage segment of the memory means adjacent to the storage segment from which the data was read out.

5. A system for displaying characters in accordance with claim 4 wherein said memory output control means reads out one storage segment earlier during each succeeding relocation cycle of an upshift cycle when reading out the appropriate segments containing data for each row.

6. A system for displaying characters in accordance with claim 5 wherein two storage segments of the memory means circulate past the memory output connection during the tracing of the number of scanlines for writing a row of characters; and said display register output control means reads out the data for each row from the display register means after holding the data in the display register means for a number of scanlines which varies for each succeeding field of a relocation cycle from one-half the number of scanlines for writing a row of characters to one.

7. A system for displaying characters in accordance with claim 6 wherein said display register means is a recirculating register means recirculating the stored data at the scanline rate.

8. A system for displaying characters in accordance with claim 7 wherein said memory means and said memory upshift register means operate with said data in series-bit, series-character format;

said display register means operates with said data in parallel-bit, series-character format;

and including serial-to-parallel conversion means connected between the memory means and the display register means for converting said data from series-bit, series-character format to parallel-bit, series-character format.

* * * * *